INVENTORS
HOWARD P. GUERBER
LINDER C. HOBBS &
ARNOLD M. SPIELBERG
BY Morris [signature]
ATTORNEY INVENTORS
HOWARD P. GUERBER,
LINDER C. HOBBS &
ARNOLD M. SPIELBERG
BY Morris A. Rabkin
ATTORNEY INVENTORS
HOWARD P. GUERBER,
LINDER C. HOBBS &
ARNOLD M. SPIELBERG
BY Morris Rabkin
ATTORNEY United States Patent Office 2,907,010

Patented Sept. 29, 1959

2,907,010

SYSTEM TO CONTROL INTER-MESSAGE SPACING

Arnold M. Spielberg, Howard P. Guerber, and Linder C. Hobbs, Haddonfield, N.J., assignors to Radio Corporation of America, a corporation of Delaware Application July 30, 1956, Serial No. 600,937

9 Claims. (Cl. 340—174)

This invention relates to information handling systems, and more particularly to an arrangement for controlling spaces between successive blocks of characters during transfers of intelligence between information storage units.

In high speed data processing systems, information is stored on various media such as magnetic tape, drums, or discs, punched paper tape or cards, and photographic film, to name a few. Information may be transferred directly between storage media of the continuous or serial type. In such a transfer of information, variations in the operating speeds of the storage devices may cause a variation in the density with which information is packed or stored in the receiving medium. Further, when such devices are intermittently operated, random variations in the starting and stopping times of these storage devices may cause either the introduction of excessive spaces between successive blocks of information, or the crowding together of successive blocks of information.

In the prior art, systems have been devised to control the spacing between messages in serial storage media and, more particularly, on magnetic tape. One such system has been described and shown in copending application Serial No. 419,226 filed March 29, 1954 by Joel N. Smith and William R. Ayres entitled "Message Spacing Control System" and assigned to the assignee of the present invention.

In the arrangement of that application, messages of non-fixed length consisting of one or more signal combinations representing alpha-numeric code characters are segregated by the presence of special character symbols at the start and end of each message. Special-character signal recognizers detect the signal indicating the beginning and end of a message and provide signals to stop input and output tapes. The special character symbols in the messages being transferred to output tapes are detected giving rise to signals, which when delayed, become signals to stop the tapes. The spacing between successive messages or the distance between successive first characters, is maintained at an acceptable minimum.

In many applications it has been found desirable to limit the number of characters in any block of information without imposing a limitation on the length of a message. As before, messages begin and end with distinctive characters. However, a fixed-length block may be only a part of a long message and may lack a special character at the beginning or the end of the block.

Further, systems of the prior art have relied upon a computer or other data processing machine to provide start impulses to the proper input and output serial storage devices and, more particularly tapes. To conserve valuable machine circuitry, ordinary message characters are utilized to generate start and stop impulses at the proper times for spacing control. The data processing machine then, need only "decide" which of the input and output devices to enable, releasing extensive circuitry otherwise necessary for generating accurately timed starting signals.

Accordingly, it is an object of the present invention to provide an improved system for generating gaps between successive blocks of information recorded on a continuous storage medium.

It is a further object of this invention to provide an improved system for generating special signals to control intermittently operating information storage devices to maintain proper spacing between successive groups of information characters independent of special character signals.

It is a still further object of the invention to provide an improved system to generate and maintain effective inter-message spacing in an information recording medium.

It is an additional object of the invention to provide an improved system for maintaining spacing intervals between successive groups of characters within predetermined limits, which system may be used with memory devices having single or multiple read-write transducing units.

A still further object of the invention is to provide a system to generate and preserve desired gaps between successive blocks of information in serial storage devices which system may be used with messages of fixed or varied length.

It is also an object of the invention to provide an improved system for creating and preserving spacing between successive blocks of recorded information within predetermined limits, which system provides start and stop signals to the recording devices.

It is a still further object of the invention to provide an improved system for starting and stopping inter-communicating magnetic tapes whereby a desired spacing between successive blocks of transferred information is created and maintained.

According to the present invention, the first one of a group of characters recorded on an input tape or other serial storage device is detected and a signal is produced. The first-character signal, suitably delayed, serves as a starting and stopping signal for input tapes. Tape selecting decisions of the information handling system enable certain tape control circuits which, when enabled, respond to the starting and stopping signals. The output tapes are started by signals timed to anticipate the arrival at a writing head of the first of a group of characters being transferred to the output tape.

The first and last characters of messages transferred to an output storage tape, also suitably delayed, provide a signal to stop the output devices when two conditions have been fulfilled. A set time must elapse between the first character of one message or block and the first character of the next message or block. Further, the last character of a message or block must precede the first character of the next succeeding message or block by a predetermined interval of time. When the space generated on the output tape is sufficient to satisfy both conditions, a stop signal is produced.

Also in accordance with the present invention, means are provided which, upon recognition of an excessive gap between successive blocks of information, stop the output tape, thereby preventing the transfer of long gaps. The first character of the block of information next transferred provides a signal to restart the output tape in time to preserve sufficient spacing.

Systems embodying the present invention may be employed generally in any large scale information handling system which may include computers, sorters, or other data processing equipment. Such information handling systems are known in the art. Suitable multi-function systems have been described in copending applications Serial No. 556,128, filed December 29, 1955 by Howard P. Guerber and Stephen M. Fillebrown; Serial No. 427,167, filed May 3, 1954 by Howard P. Guerber entitled "Sorting Apparatus"; and Serial No. 440,646, filed July 1, 1954 by William R. Ayres and Joel N. Smith entitled "Information Handling System," all of which have been assigned to the assignee of the present invention. These copending applications describe systems that can sort, extract by class or list, and merge information. Such systems use magnetic tape as a medium both for the presentation of input data and to record the output of the system.

A magnetic tape system using two separate transducing heads at each tape handling unit has been described in the above mentioned applications. The transducing heads at each tape unit are called, for convenience, the alpha ($\alpha$) head and beta ($\beta$) head. Each $\alpha$ head reads the initial portion of every message and provides information signals to the decision making elements of the information handling system. The $\beta$ head reads entire messages and transmits them to the writing circuits of the output tape units. The use of $\alpha$ and $\beta$ heads takes advantage of the inherent storage capacity of the tape and allows the system to make tape selecting decisions based on a message being read by the $\alpha$ head at a time when a preceding message is being transferred by the $\beta$ head to an output tape.

The above-mentioned applications also contain description of an alpha-numeric binary code signal system that may be used with the magnetic tape and which code includes distinctive character symbols such as start message (SM), end message (EM), item separator (ISS), and other special code combinations, as distinct from information characters of the message. Intelligence is recorded in the form of individual binary digits or "bits" which, in parallel combination, form characters. Characters combine serially to form words, that is "items," which in turn form messages. One or more messages may comprise a file.

The above cited systems impose no limitation on the length of a message. However, a complete message utilizes special symbols to identify its beginning and end. These special symbols may be recognized. After a suitable delay, the recognition signals can be combined in a means to provide signals to stop tapes when a predetermined minimum time has elapsed after the start or end of a message.

Alpha-beta circuits have been found especially useful in sorting operations since only part of a message need be read. The alpha head is used to read the criterion upon which the sort is to be made. Whether or not the tape is stopped, the beta head reads an entire message to an output tape without concern for the portion of the message under the $\alpha$ head. However, tape stations not normally involved in sorting operations have only occasional use for both the $\alpha$ and $\beta$ heads. These tape stations comprise the reference file and in view of the infrequent use in intermittent operation, it is economically advantageous to eliminate one of the heads at each of these tape stations. A single magnetic drum, having a read head following the write head at a time-distance interval equivalent to the alpha-beta time-distance separation, may fulfill the $\beta$ head function for all of the tape stations lacking $\beta$ heads. The intervals must be measured with respect to the speed of the recording medium relative to the distance between the heads so that the time interval between writing and reading on the drum can be made equal to the time interval between the readings of the same character by the $\alpha$ and $\beta$ heads.

A detailed description of alpha-beta circuits and the logical network applicable thereto will not be attempted herein. There is sufficient description in the above cited copending applications to make such inclusion unnecessary here.

Although drawn specifically to magnetic tapes, the present invention may be applicable to systems using non-volatile storage devices wherein messages are serially ordered, as, for example, paper tape, magnetic discs or drums, phonographic recording, photographic recording, or the like. The present invention may be used with a system utilizing either fixed-length messages, or varied length messages which may include special character symbol recognizers.

The novel features of the invention as well as the invention itself, both as to its organization and method of operation, will best be understood from the following description when read in connection with the accompanying drawings in which like reference numerals refer to like parts, and in which.

Figure 1:
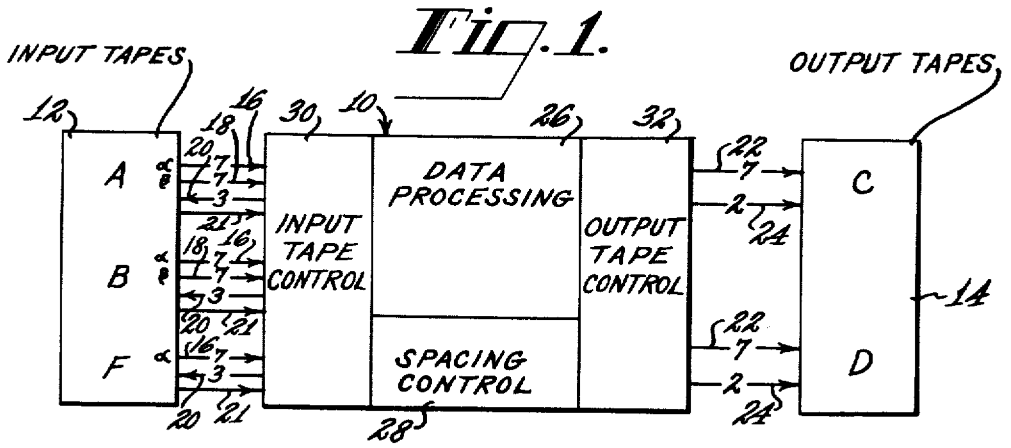
Fig. 1 is a block diagram of an information handling system which may be used in conjunction with the present invention.
Figure 4:
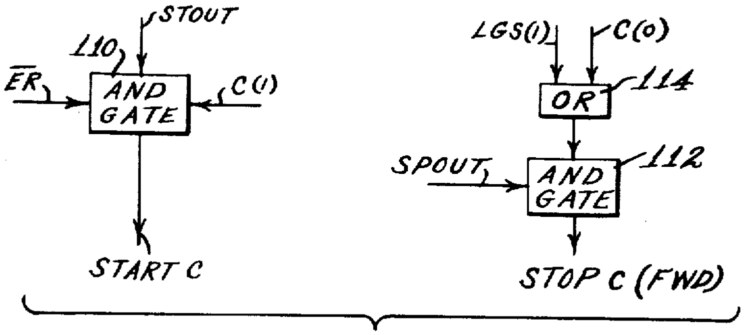
Fig. 4 is a block diagram of a control circuit for one output tape.
Figure 5:
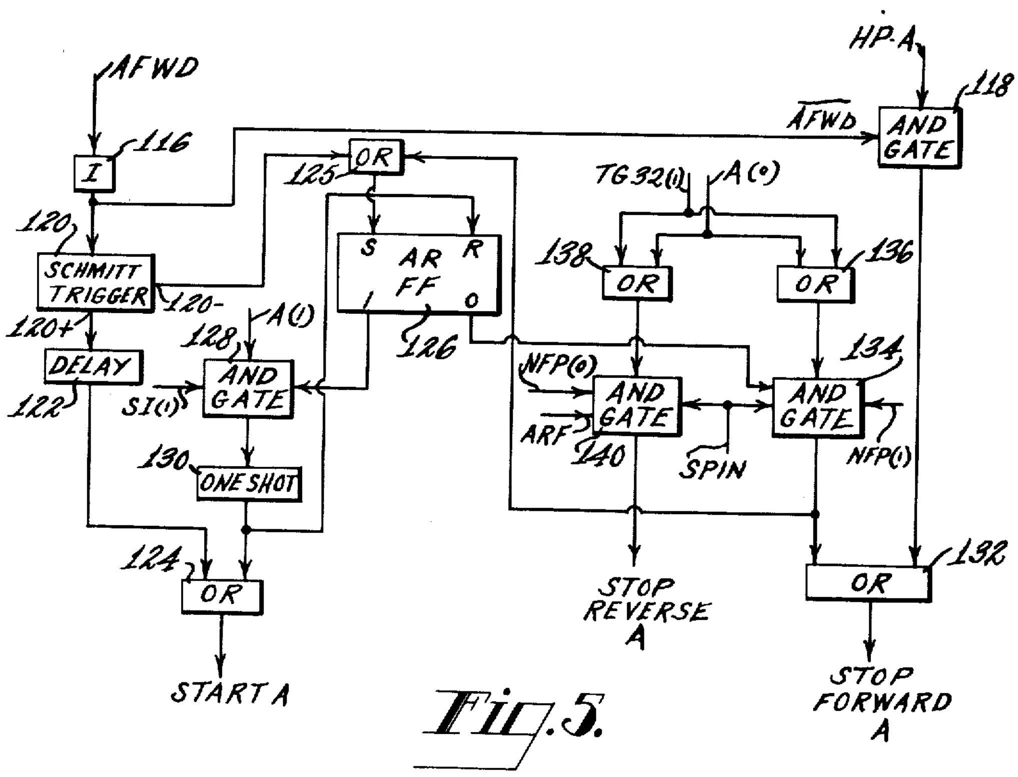
Fig. 5 is a block diagram of a control circuit for one input tape.

In the Figures 4 and 5, it is to be understood that the control system for only one magnetic tape station is shown although several tapes are used in the system, as indicated in Figure 1. Tapes having similar input or output functions are controlled by similar control circuits.

In Fig. 1, an information handling system 10, operating upon information presented from external information sources, for example, input tapes 12, provides information to external message systems, for example, output tapes 14. In the system described in the above-mentioned copending applications, three input tapes 12, indicated by A, B, and F, are used in conjunction with two output tapes 14, indicated by C and D. Input tape stations A and B, equipped with $\alpha$ and $\beta$ reading heads, communicate with the information handling system 10 by means of multi-channel (for example, seven) lines 16 and 18. Input tape stations indicated by F need have only an $\alpha$ head, and therefore, communicate with the information handling system 10 through the multi-channel line 16. Similarly, if input tape stations A and B, having an $\alpha$-head only in conjunction with a single magnetic drum, communicate with the information handling system 10 through the multi-channel line 16 only, the magnetic drum may be included within the system 10, permitting elimination of the multi-channel line 18.

The information handling system 10 provides control signals to the input tape stations 12 by means of a multi-channel (for example, three) line 20. Special signals from each of the transport mechanisms are provided to the system 10 on line 21. Messages are transferred by the information handling system 10 to output tape stations 14 by the multi-channel (for example, seven) line 22. Control signals are sent to the output tape stations 14 through the multi-channel line 24.

The information handling system 10 is subdivided into a data processing portion 26, a spacing control portion 28, an input tape control unit 30, and an output tape control unit 32.

Figure 2:
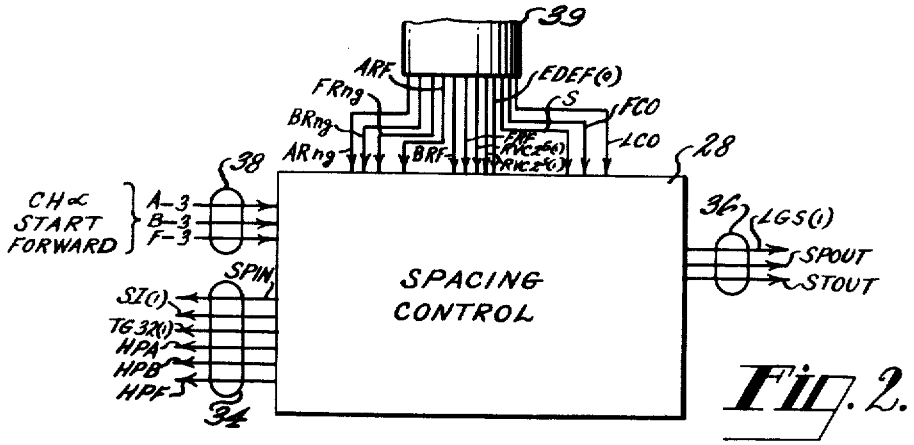
Fig. 2 is a block diagram of a spacing control portion of the system of Fig. 1.

In the diagram of Fig. 2 the spacing control portion 28 is shown to indicate the interconnection with other portions of the system of Figure 1. Control signals are applied to the input tape control circuits 30 on multi-channel line 34. Control signals to the output tape control circuit 32 are applied on multi-channel line 36. Control signals from input tapes 12 and input tape control circuits 30 are applied on multi-channel line 38. The data processing portion 26 applies control signals on multichannel line 39.

Figure 3:
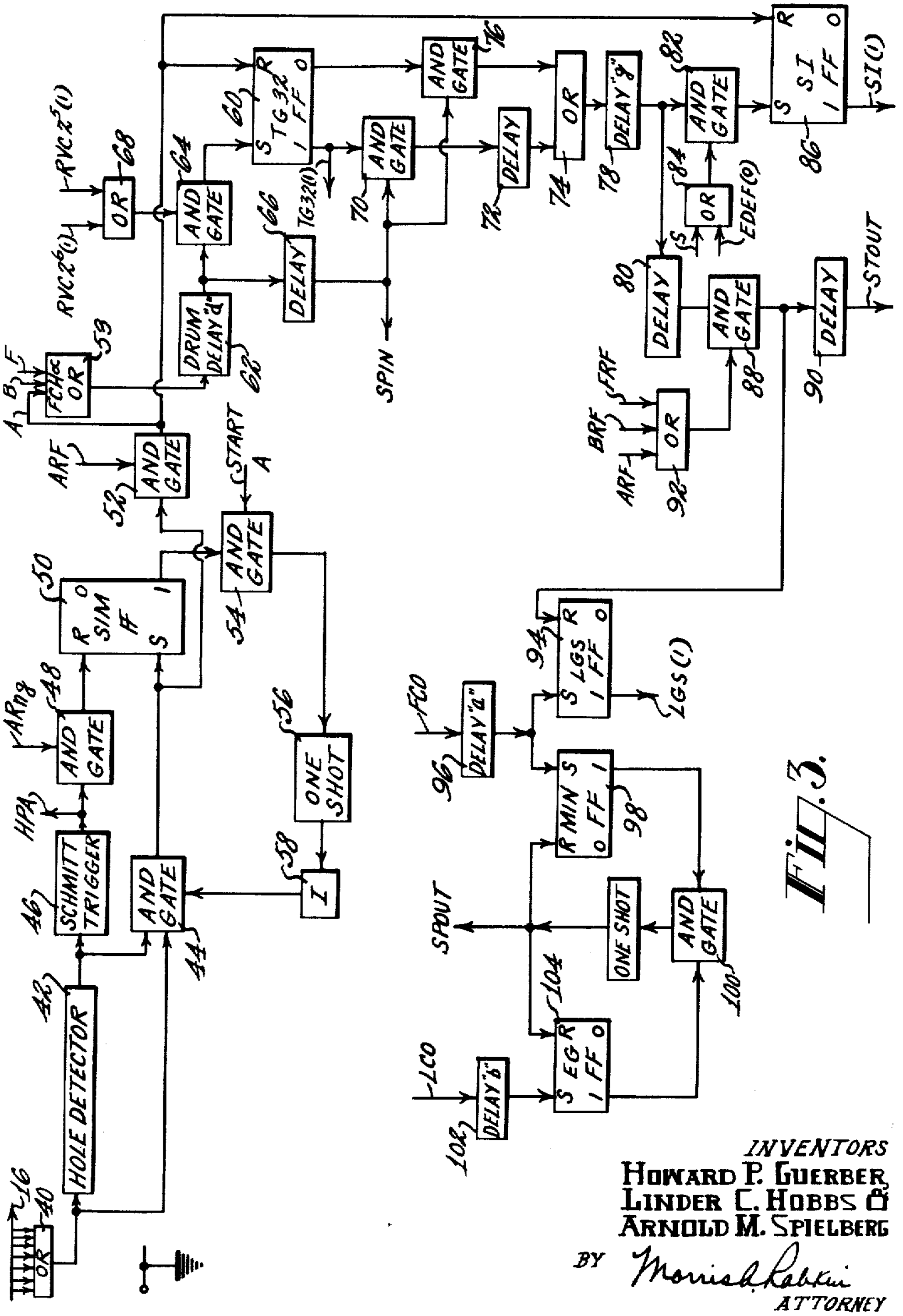
Fig. 3 is a block diagram of a spacing control system which may be employed in the spacing control portion 28 of Fig. 2.

As illustrated in Fig. 3, the α head of tape station A (not shown) is connected to the multi-channel line 16 which connects with the data processing portion 26. A conventional "or" circuit 40 having multiple inputs and an output and providing an output signal if a signal is applied to any input terminal, is connected to multichannel line 16. Each input to the "or" circuit 40 corresponds to a different recording channel on the tape. The output of the "or" circuit 40 divides, one output going to a hole detector 42, to be more fully described in connection with Fig. 6. The second output is applied to a three-input "and" gate 44. The output of the hole detector 42 connects to a second input of the "and" gate 44 and to a Schmitt trigger 46.

A Schmitt trigger is a form of monostable circuit which provides an output when driven into the unstable state and remains in the unstable state so long as the driving force is present. When the driving force is removed, the trigger returns to its stable state. The Schmitt trigger may be modified by the addition of pulse generators to provide a pulse output at each transition. The Schmitt trigger 46 pulse output signal, produced on return to the stable state, is called Hole Pulse A, HPA, and is applied to other portions of the circuit as described below. The HPA signal activates one input of a two-input "and" gate 48. The "and" gate 48 receives an enabling pulse on its second input from a source (not shown) which provides a signal indication that the tape transport mechanism is running, A R*ng*.

The output of the "and" gate 48 is connected to the reset terminal of the Start Inside a Message (SIM) flip-flop 50. The set terminal of the SIM flip-flop 50 receives the output of the "and" gate 44. This output of "and" gate 44 also goes to the two-input "and" gate 52. The output of the "and" gate 52 is designated First Character α, F C*h*α. The "one" output from the SIM flipflop 50, SIM(1) enables one input of a two-input "and" gate 54. The second input to the "and" gate 54 is a Start A signal applied from the start A terminal of the input tape control circuit to be more fully explained in connection with Fig. 5.

The output of the "and" gate 54 goes to a one-shot (a monostable multivibrator) 56, the output of which is applied to an inverter 58. The inverter 58 connects to the third input of the "and" gate 44. The "and" gate 52 is enabled at its second input by a signal ARF from a source within the data processing portion 26 (not shown) which is responsive to signals from the A tape station indicating that tape is running and that the tape drive is in the "forward" direction. The output of the "and" gate 52 resets a "TG–32" flip-flop 60, which flip-flop indicates by its set or reset condition, respectively, that the number of characters in the storage buffer or tank is, or is not, greater than 32.

The output of the "and" gate 52 is applied to one input of a three input FC*h*α "or" circuit 53. The FC*h*α "or" circuit 53 receives FC*h*α signals from similar circuits responsive to B tape and F tape signals. The output of the FC*h*α "or" circuit 53 goes to a delay means which may involve the use of a channel of a magnetic drum 62. Read heads in other channels of the drum 62 serve as a β head for tape stations having α heads but not β heads. Any suitable delay means may be employed if a drum is not used for this purpose. The delayed output from the drum 62 goes to a two-input "and" gate 64 and also to a delay circuit 66. An output taken from the delay circuit 66 provides a signal SPIN to stop the input tapes, and is applied also to the circuit of Fig. 5.

A buffer storage, or surge tank, not shown, accepts character signals from the reading heads at a random rate and reads the characters out at a uniform rate. A suitable "surge tank" has been described in the copending application of Kun Li Chien and Charles H. Propster, Jr., Serial No. 465,586 entitled "Serial Memory" filed October 29, 1954. The use of the tank permits the transfer of uniform character signals at a controlled rate to a writing means at an output tape, thereby preventing the transmission of any signal irregularities due to input tape skew and flutter. A reversible counter, not shown, indicates the total number of characters in storage at any time and enables read out of information when the storage is half full. The $2^6$ bit and the $2^5$ bit (not shown) counter outputs labeled, respectively, RVC$2^6$(1) and RVC$2^5$(1) are applied to the two-input "or" circuit 68 which activates the second input of the "and" gate 64. The output of the "and" gate 64 is applied to the set terminal S of the TG–32 flip-flop 60.

The TG–32 flip-flop 60 provides a "one" output, TG–32(1), which is utilized in the circuits of Fig. 5 explained below. TG–32(1) is also connected to one input of a two-input "and" gate 70 (Fig. 3), the other input of which receives the SPIN signal from the delay 66. The output of the "and" gate 70 goes through a delay means 72 and then to a two-input "or" circuit 74. The TG–32(0) output of the TG–32 flip-flop 60 is applied to a two-input "and" gate 76 whose second input is also primed by the SPIN signal, and whose output is applied to the second input of the "or" circuit 74. The output of the "or" circuit 74 is delayed by a time "g" in the delay means 78.

The output of the delay means 78 connects to both a delay means 80 and a two-input "and" gate 82. The second input of the "and" gate 82 is activated by a two-input "or" circuit 84 which is connected to signal sources S, and EDEF(0) (not shown) within the data processing portion 26. An EDEF(0) signal indicates that the system is carrying out an information handling process. The signal S is produced if the system is operating in the "sort" mode.

The output of the "and" gate 82 goes to the set input S of the Start Input (SI) flip-flop 86. The SI flip-flop 86 is reset by the FC*h*α signal from the output of the "and" gate 52. The output of the delay 80 goes to one input of a two-input "and" gate 88. The output of the gate 88, after passing through a delay means 90 produces a signal STOUT to start output tapes. The second input of the "and' gate 88 is activated by the output of a three-input "or" circuit 92 which receives signals ARF, BRF, and FRF from sources (not shown) with in the data processing portion 26 of Fig. 1 indicating respectively that the input tapes A, B and F are running forward.

The undelayed output of the "and" gate 88 resets the Large Gap Shrinker (LGS) flip-flop 94, which is set by a signal FCO signalling the appearance of a first character from the buffer storage or surge tank (not shown), delayed by a time "*a*" by the delay means 96. The output of the delay 96 sets both the LGS flip-flop 94 and a Minimum gap (Min) flip-flop 98. The LGS(1) output of the LGS flip-flop 94 is applied to the circuit of Fig. 4 described below in greater detail. The Min(1) output (the "one" output) of the Min flip-flop 98 is applied to one input of a two-input "and" gate 100.

A signal corresponding to the last character of a block emerging from the surge tank, LCO, goes into a delay means 102 providing a delay of time "*b*" and is applied to the set terminal S of an End Gap (EG) flip-flop 104. The "one" output EG(1) of the EG flip-flop 104 goes to the other input of the "and" gate 100. The output of the "and" gate 100 triggers a one-shot 106, producing a signal, SPOUT to stop the output tapes. The SPOUT signal resets both the EG and Min flip-flops 104, 98.

In Fig. 4, the Start and Stop Forward signal sources of the output tape control block 32 of Fig. 2 are shown in diagram form for a typical output tape station, foı example output tape C. The Start signal is produced by the output of a three-input "and" gate 110 which receives, from sources not shown here, a non-error signal, ER, from the data processing portion 26 of Fig. 1, the STOUT signal from the control system of Fig. 3, and a tape C selected signal, C(1), from the data processing portion 26.

The signal to Stop the tape C so that, on restarting, the tape moves in the forward direction, Stop C (forward) is produced at the output of a two-input "and" gate 112. One input to the "and" gate 112 is received from the SPOUT signal output of the "and" gate 100 of Fig. 3 and the other input is connected to the output of a two-input "or" circuit 114, responsive either to the signal LGS(1) from the LGS flip-flop 94 of Fig. 3, or a tape-not-selected signal, C(0), from the tape selection circuit (not shown) of the data processing portion 26. Such signals are provided in the system of the abovementioned Guerber-Fillebrown application.

Fig. 5 is a diagram, in greater detail, of the input tape control 30 of Fig. 2. The circuit, as shown, may control an A input tape. For those tape stations with an α head only, provision is made for a back-up routine in the event that the tape is stopped with the α head resting within a message. A bistable device at the tape station (not shown) provides an A forward signal, AF*wd*, which indicates the direction in which the tape will run when started, and which is applied to an inverter 116. The signal AF*wd*, after inversion, goes to one input of a two-input "and" gate 118, and to a Schmitt trigger circuit 120 similarly modified as the Schmitt trigger 46 of Fig. 3, to provide a pulse at one output 120+ when the input voltage rises and a pulse at a second output 120— when the input voltage falls. The rising voltage pulse output 120+ of the Schmitt trigger 120 is applied to the delay 122 and then to a two-input "or" circuit 124 producing a Start A signal in response to which tape A is started. The falling voltage pulse output 120— is applied to one input of a two-input "or" circuit 125. The signal output of an "and" gate 134, described below, is applied to the second input of the "or" circuit 125. The output of the "or" circuit 125 is applied to the set terminal S of an A Ready (AR) flip-flop 126.

The AR(1) output of the AR flip-flop 126 is applied to a three-input "and" gate 128. A second input of the "and" gate 128 is connected to the SI(1) output of the SI flip-flop 82 of Fig. 3. The third input to the gate 128 of Fig. 5 receives a signal, A(1), from the data processing portion 26 indicating that the tape A has been selected for operation. The output of the "and" gate 128 is applied to a one-shot 130.

The output of the one-shot 130 is connected to the other input of the "or" circuit 124, and also to the reset terminal R of the AR flip-flop 126. The two-input "and" gate 118 has as its second input the HPA output of the Schmitt trigger 46 of Fig. 3. The output of "and" gate 118 is connected to one input of a two-input "or" circuit 132, the output of which provides a signal Stop Forward which is applied to the tape control mechanism (not shown) for stopping the tape so that the tape will run in the forward direction when next started. The output TG–32(1) of the TG–32 flip-flop 60 of Fig. 3 is applied to one input of each of two, two-input "or" circuits 136 and 138. The second input to each of the "or" circuits 136, 138, is an "A not selected" signal, A(0), from the data processing portion 26. The output of the "or" circuit 136 is applied as one input of a four-input "and" gate 134. A second input of the gate 134 is connected to the AR(0) output of the AR flip-flop 126. A third input of the gate 134 is energized by the SPIN signal from the delay means 66 of Fig. 3.

The SPIN signal also energizes one input of a four-input "and" gate 140 of Fig. 5. A second input of the "and" gate 140 receives the output of the "or" circuit 138. A third input of the "and" gate 140 is received from the ARF signal from the data processing portion 26 of Fig. 2.

The fourth inputs to the "and" gates 134 and 140 are applied from the two outputs NFP(1) and NFP(0), respectively, of an NFP flip-flop (not shown here) within the data processing portion 26. An NFP(1) signal indicates that the information handling system 30 is either (*a*) in the second or subsequent pass of a "sort" routine, or (*b*) if the input tape station being used has both α and β heads. The NFP(0) signal indicates that the system is either (*a*) in the "sort" mode and making the first pass of sort on the unordered information, (*b*) in any mode of operation other than sort, or (*c*) using an input tape station having only an α reading head.

The output of the "and" gate 134 primes the other input of the "or" circuit 132. The output of the "and" gate 140 provides a signal Stop-Reverse A for stopping the tape A so that, when started again, the tape travels in the reverse direction, backing up to the start of the information block.

Figure 6:
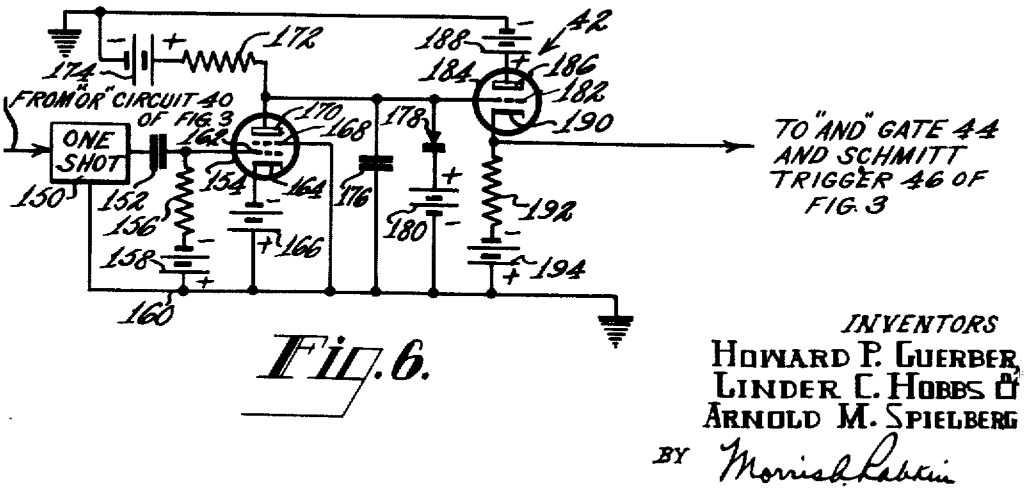
Fig. 6 is a schematic diagram of a hole detector 42 of Fig. 3.

In Fig. 6, a schematic diagram is shown of the hole detector 42 of Fig. 3. Incoming signals appearing at the output of the "or" circuit 40 are fed into the hole detector 42 at the one-shot 150. The output of the one-shot 150 is applied to the grid 162 of a multi-element tube 154 through a capacitor 152. A resistor 156 is connected at one terminal to a source of negative bias 158 which is connected to a common conductor 160 indicated by the conventional ground symbol. The other terminal of the resistor 156 is connected between the capacitor 152 and the grid 162 of the multi-element tube 154.

The cathode 164 of the tube 154 is connected to a source of negative bias 166 which is connected to the common ground 160. A screen grid 168 is also connected to the common ground 160. An anode resistor 172 is connected between the anode 170 and a suitable source of anode voltage 174 which is connected to the common ground 160.

The output of the multi-element tube 154 is taken between the anode 170 and the resistor 172 and is applied to a grid 182 of a triode 184. A capacitor 176 is connected between the anode 170 of the tube 154 and the common ground 160. A clamping diode 178 has its anode connected to the anode 170 of the tube. The cathode of the diode 178 is connected to the positive terminal of a D.C. (direct current) source 180. The other, negative terminal of the source 180 is connected to the common ground 160. The anode 186 of the triode 184 is connected to a suitable source of anode voltage 188 which has a negative terminal connected to the common ground 160. The cathode 190 of the triode 184 is connected through a cathode resistor 192, and then through a source of negative supply 194, to the common ground 160. The triode 184 is connected to provide a cathode follower output which is applied to the Schmitt trigger 46 and the "and" gate 44 of Fig. 3.

An information handling system 10, such as may be used in conjunction with the present invention, is described in the aforementioned copending applications of Guerber and Fillebrown, Ayres and Smith, and Guerber. These applications also describe magnetic tape transport devices suitable for use with the arrangement described herein. However, other tape transport mechanisms are known which are also suitable for use with the arrangement described herein.

One embodiment of the invention may include an input tape 12 carried by a tape station having an α head only. The incoming characters are detected by the α head and signals appear on multiple input line 16 of Fig. 1 and Fig. 3. The signals from all channels of the input line 16 are applied to the "or" circuit 40. Every binary character provides a signal in at least one channel. The signals are applied to the hole detector 42, detailed operation of which is explained below. The first signal pulse appearing after a predetermined lapse in signals generates a low-voltage level output in the hole detector 42 which, when applied to the "and" gate 44, blocks the gate to incoming pulses from the "or" circuit 40. The succeeding pulses applied to the hole detector 42 maintain the lowered voltage. The response time of the hole detector 42 is such that only the first pulse of the incoming information signals is passed before the "and" gate 44 is closed.

The "and" gate 44 is enabled by the output of the inverter 58 and by the high level output of the hole detector 42 that exists in the absence of signals on line 16. The output of the "and" gate 44 sets the SIM flip-flop 50. If no further character signals are detected at the "or" circuit 40, and a predetermined interval of time elapses during which no input signals are applied to the hole detector 42, a voltage level is generated which triggers the Schmitt trigger 46 and a pulse is produced, HPA. The HPA pulse is applied to the "and" gate 48. Should the tape stop, the A R*ng* signal ceases, closing the "and" gate 48 before the generation of the HPA pulse, thereby preventing reset of the SIM flip-flop 50.

The SIM flip-flop 50 is set by the pulse output of the "and" gate 44 and is reset by the output of the "and" gate 48 when the α head encounters a blank space on a moving tape exceeding a predetermined spacing between characters. The hole detector 42 and Schmitt trigger 46 in combination produces an HPA pulse at a certain fixed time after the signal output of the "or" circuit 40 ceases. To distinguish between HPA pulses generated between messages, and similar pulses generated when a tape stops, the "and" gate 48 is enabled only when the tape is in motion.

The SIM(1) output enables the "and" gate 54. The signal to start the A tape (Start A) is passed by the "and" gate 54 whenever the A tape has been stopped with the α head resting within a message. The first character signal appearing after the A tape starts is applied to the hole detector 42 and to the "and" gate 44. However, the Start A pulse, passing through the enabled "and" gate 54 triggers the one-shot 56. The high voltage output of the one-shot 56 is inverted at the inverter 58 and the low level inverter output closes the "and" gate 44.

The single-pulse output of the "and" gate 44, indicating the first of a series of character signals, is applied to the "and" gate 52. The signal ARF, indicating that the A tape is running forward, is applied to enable the "and" gate 52, the output of which, A–F C*h*α, is applied to the FC*h*α "or" circuit 53. Other inputs to the FC*h*α "or" circuit 53 are applied from similar first character detecting circuit connected to the α heads for the B and F tapes. The output of the FC*h*α "or" circuit 53, FC*h*α, resets the TG–32 flip-flop 60 and the SI flip-flop 86.

The FC*h*α signal is delayed in the drum 62 by a time "*d*" which gives the information handling system 30 time in which to read the sort zone of the incoming message. In this time interval, a decision may be made in the data processing portion 26, selecting the input tapes to be run and the output tape upon which the message of the selected input tape is to be written. Tape selecting signals are applied to the tape control circuits 30, 32.

The count stored in the reversible counter associated with the surge tank indicates the presence of characters from a preceding message awaiting read-out. If the surge tank is less than half full, there is no output from the "or" circuit 68. Consequently, the delay FC*h*α pulse cannot pass the "and" gate 64 and the TG–32 flip-flop 60 is not set. The FC*h*α is applied to the delay means 66 and the SPIN signal output is taken from this point in the circuit.

Referring now to Fig. 5, if the A tape is to continue to run, and the TG–32 flip-flop 60 is in the reset condition providing a TG–32(0) output, the A tape will be unaffected by the SPIN signal. If, however, the A tape is not to run, indicated by the A(0) signal at the "or" circuits 136 and 138, one of the "and" gates 134, 140 provide a stop signal if enabled on the other inputs by the mutually exclusive signal combinations of AR(0) and NFP(1) or ARF and NFP(0), respectively. If the A tape station has an α head only, the NFP flip-flop (not shown) is reset and the NFP(0) enabling signal is applied to gate 140. At the same time a disabling level is provided at the NFP(1) output terminal of the same flip-flop to close the "and" gate 134. The fourth input of the "and" gate 140 is activated by the ARF signal, generated when the A tape is running in the forward direction. The SPIN signal is passed by the "and" gate 140 to provide a signal to stop the A tape, Stop Reverse A. When the A tape stops, the condition of a "Forward" bistable device, for example a relay at the tape station (not shown) changes, depending upon the source of the stop signals. If the "or" circuit 132 signals to stop the tape, Stop Forward A, the next start will be in the forward direction. Conversely, if the "and" gate 140 stops the tape, Stop Reverse A, the next start will be in the reverse direction.

The A tape having been stopped on a signal from the "and" gate 140, the Forward relay applies a low-voltage level signal to the inverter 116. The inverted signal, a high-voltage level, enables the "and" gate 118 and fires the modified Schmitt trigger 120. The rise-pulse output 120+ is applied to the delay circuit 122 and is then passed by the "or" circuit 124 to provide a signal to start the A tape, Start A.

The signal Start A is sent to the "and" gate 52 of Fig. 3. The backing up A tape is read by the α head and a stream of character pulses is applied to the "or" circuit 40, generating a low voltage level output in the hole detector 42. However, as described above, the "and" gate 44 is closed. The output of the one-shot 56, triggered by the output of the "and" gate 54 in response to the combined presence of the signals SIM(1) and Start A, is inverted to disable the "and" gate 44. When the A tape has backed up to the gap between message blocks, the output of hole detector 42 of Fig. 3 rises, firing the Schmitt trigger 46 to produce the signal HPA. The signal HPA passes the "and" gate 118 of Fig. 5, which is enabled by the inverted Forward signal, $\overline{\text{Forward}}$, and is applied to the "or" circuit 132 to provide a signal to stop the A tape, Stop Forward A. The Forward relay changes state and the voltage level output of the inverter 116 falls. The Schmitt trigger 120 changes state and produces a pulse at the output 120(−) which is applied to the "or" circuit 125, the output of which sets the AR flip-flop 126.

The "and" gate 128, when fully enabled by the output of the SI flip-flop 82 of Fig. 3, SI(1), a signal selecting the A tape, A(1), and the output of the AR flip-flop 126, AR(1), applies a high voltage level input to the one-shot 130. The high level triggers the one-shot 130, providing a pulse signal to reset the AR flip-flop 126, and a signal input to the "or" circuit 124 which provides the Start A signal.

If the A tape is stopped in response to the signal output of the "or" circuit 132, Stop Forward A, applied by the "and" gate 134, and the "and" gate 134 output is also applied to the "or" circuit 125 to set the AR flip-flop 126. At the application of the tape selector signal, A(1), and the SI(1) signal, the Start A signal is produced as described above.

If the surge tank (having a capacity of 64 characters) contains more than 32 characters, that is, is more than half full when the SPIN signal is given, the input A tape at an α head only tape station will stop, back up and stop again as above. Tape at α—β tate stations merely stop. The half-filled condition is signalled by the reversible counter flip-flops. A high level from either the flip-flop at the $2^6$ stage RVC$2^6$(1), or the flip-flop at the $2^5$ stage, RVC$2^5$(1), indicates a count greater than 32. The flip-flop outputs are combined in the "or" circuit 68 of Fig. 3 and prime one input of the "and" gate 64. The "and" gate 64 is then open to pass the FC*h*α signal from the delay means 62, and set the TG–32 flip-flop 60, producing an output TG–32(1). The TG–32(1) output signal primes one input of each of the "or" circuits 136, 138 of Fig. 5 which in turn enable the "and" gates 134, 140. At the occurrence of the signal SPIN, one of the "and" gates 134, 140 will be open to pass this signal SPIN and the A tape is stopped.

If the FC$h\alpha$ signal sets the TG–32 flip-flop 60, then the 32 or more characters of the prior message stored in the tank will occupy more space on the output tape than on the input tape, since the FC$h\alpha$ signal represents the start of the next block of characters. Therefore, the next block of characters on the input tape, if directly transmitted, would be written on the output tape before sufficient gap between blocks is created. To prevent such writing before a sufficient gap occurs, the TG–32(1) signal opens the "and" gate 70, passing the FC$h\alpha$ through further delay means 72 which delays the FC$h\alpha$ signal for an interval equivalent to the time required to transfer 32 characters out of the surge tank. If the surge tank is less than half full and the "and" gate 64 is closed, the TG–32 flip-flop 60 remains reset, and the TG–32(0) signal opens the "and" gate 76 to the FC$h\alpha$ signal, permitting a by-pass of the delay 72. The outputs of the delay means 72 and of the "and" gate 76 are both applied to the "or" circuit 74 at such time when the surge tank contains less than 32 characters.

The output of the "or" circuit 74 is delayed an amount "g" at the delay means 78, and divides, going to both a further delay means 80 and to an "and" gate 82. The delay "g" provides time during which the remaining characters in the surge tank can be transferred out and a new input tape can be started, should the information handling system "decide" to change input tapes. The delay "g" also provides time to compensate for possible variations in the tape transport starting and stopping speeds at the tape stations with $\alpha$ and $\beta$ heads. Should the start time of one transport mechanism be short and the stopping time long, the message may appear at the $\beta$ head almost immediately after the start signal is given. However, tape stations without $\beta$ heads must reverse the tape to the start of the message block before the tape can be restarted. In order that $\alpha$—$\beta$ tape stations need not back up if stopped, the length of the sort zone (the initial message portion containing the sorting key) of the message is specified to be never more than the spacing between the $\alpha$ and $\beta$ heads less the distance required to stop a tape, restart it, and bring it up to proper (running) speed. When re-started, the tape should reach the proper running speed by the time the beginning of the message block reaches the $\beta$ head.

The "and" gate 82 (Fig. 3) is opened by output signals from the "or" circuit 84. Input signals to the "or" circuit 84 originate in the data processing portion 26 indicating either that the information handling system is in the sort mode, S, or, in the case of other modes, that the last message on the tape has not yet been reached, EDEF(0). The open "and" gate 82 passes the delayed FC$h\alpha$ signal to set the start input flip-flop 86 (SI). The output, SI(1), opens one input of the "and" gate 128 of Fig. 5, enabling one input of the "and" gate 128.

The delayed FC$h\alpha$ pulse, also provides a signal to start output tapes, STOUT, (Fig. 3). The delay means 78 applies the FC$h\alpha$ to the "and" gate 88 through the delay means 80. The "and" gate 88 is enabled by a signal from the data processing portion 26 through the "or" circuit 92, indicating that one of the input tapes, A, B, or F, is running forward, ARF, BRF, or FRF respectively. A "decision" to stop all input tapes or to switch to an input tape on an $\alpha$ head only tape station results in a low level at all inputs of the "or" circuit 92 in the time between the application of the SPIN signal and the arrival of the FC$h\alpha$ pulse at the "and" gate 88. Should a signal to start an input tape be generated after the SI flip-flop 86 is set (described in detail above in connection with Fig. 5), the delay means 80 provides time in which to enable the "and" gate 88. The ARF, BRF, and FRF signals are generated when the start signal is applied to a tape station in condition to run in the forward direction.

The FC$h\alpha$ pulse passes through the open "and" gate 88 to reset the large gap shrinker flip-flop 94, (LGS), and, after a delay at the delay means 90, the start output signal, STOUT is applied to all of the output tape stations. If the C output tape is selected to run, the "and" gate 110 (Fig. 4) receives enabling inputs from the tape selection signal C(1) and the non-error signal $\overline{ER}$, both originating in the data processing portion 26.

A message transferred from an $\alpha$-only tape station is written into the delay means 62 for example, a magnetic drum. The message is read by the drum-read or $\beta$ head after a delay equivalent to the time required for a point on a normally running tape to travel from the $\alpha$ head to the $\beta$ head at an $\alpha$—$\beta$ tape station.

The first character out signal, FCO, may be derived either from the $\beta$ head after suitable delays or from the reversible counter flip-flop signals, RVC$2^5$(1) or RVC$2^6$(1) which are applied to the "or" circuit 68 of Fig. 3. Also, circuitry similar to that described above for deriving the FC$h\alpha$ signal could be used at the surge tank output to derive a signal from the first character that is read out of the surge tank. If the surge tank is modified to provide read out only when containing more than 32 characters, the RVC flip-flops provide adequate FCO signals.

The FCO signal is delayed by an amount "$a$" at the delay means 96 (Fig. 3) and sets both the large gap shrinker flip-flop 94 (LGS) and the minimum gap flip-flop 98 (Min). The delay "$a$" introduces a time lag equivalent to the time required for tape to travel from the $\alpha$ head to the $\beta$ head. The first character of one block of information and the first character of the succeeding block of information are therefore separated on the tape by the distance equivalent to the $\alpha$—$\beta$ head spacing.

The last character coming from the surge tank may be recognized by a device similar to the hole detector 42 of Fig. 3 in combination with a Schmitt trigger 46 to produce a pulse similar to the signal HPA. There are, however, signals available from the data processing portion 26 indicative of the recognition of a terminal character such as EM, ED, or EF, or from counters which signal the detection of the maximum number of characters per block. This last character out signal, LCO, preferably derived from these signals is delayed at the delay means 102 by an amount "$b$." The delay "$b$" provides a time lag equivalent to the maximum start and stop time for any tape drive mechanism at a tape station. The delayed LCO signal sets the end gap flip-flop 104 (EG).

The outputs of the EG flip-flop 104 EG(1) and of the Min flop-flop 98, Min(1) are applied to the "and" gate 100. When both signals are present, the "and" gate 100 is enabled and triggers the one-shot 106 to produce a signal to stop output tapes, SPOUT. The SPOUT signal resets both the Min flip-flop 98 and the EG flip-flop 104. The SPOUT signal stops the "C" output tape if the "and" gate 112 (Fig. 4) has been enabled either by the LGS(1) signal, indicating that the first character of a message has come from the surge tank, or, by a signal indicative of C-output tape non-selection, C(0). The signal to stop the tape in a condition to be restarted in the forward direction, Stop Forward, is derived from the output of the "and" gate 112. Should the next message follow at the minimum acceptable distance, the LGS flip-flop 94 (Fig. 3) is reset by the next FC$h\alpha$ signal, disabling the "and" gate 112, before the SPOUT signal is generated, and preventing interruption in the running of the output tape C.

The operation of the system is somewhat simpler when dealing with tape stations having both the $\alpha$ and $\beta$ heads. In such cases, the input messages are not delayed by a drum or other means 62 and further, input tapes may be stopped with the $\alpha$ head resting within a message. The $\alpha-\beta$ spacing is such that the $\beta$ head has finished reading a message at the time that the $\alpha$ head finishes reading the sort zone of the next successive message. The delay "g" prevents successive messages on the same output tape from running together due to variations in the start times of different input tapes by delaying SI(1) signal until the surge tank is emptied of the preceding message. The SI(1) signal therefore lags behind the LCO signal and the first character of a message block arrives at the C write head after time has elapsed sufficient to start the selected input tape and half fill the surge tank.

With reference to Fig. 6, in operation, the incoming character pulses from the "or" circuit 40 of Fig. 3 are applied to trigger the one-shot 150, each pulse resulting in a pulse of extended duration. The pulse thus generated may be considered positive with respect to ground, and is applied to the grid 162 of the multi-element tube 154 through the resistor-capacitor combination 152, 156, causing conduction of the tube 154. Pulses from each successive character similarly cause conduction of the tube 154. The output of the tube 154, taken from the anode 170 is applied to the grid 182 of a triode 184. A positive potential is applied to the grid 182 through the resistor 172 and the clamping diode 178. The capacitor 176 is charged from the bias source 174 and is discharged whenever the tube 154 conducts. The time constant of the charging circuit is adjusted so that for each character signal, the tube 184 remains cut off for a time interval equivalent to a predetermined character arrival time.

In one embodiment, the circuit is adjusted to indicate the cessation of characters, due, for example, to a gap in the message, or, stopping of the tape. A pulse is produced after the interval required for the arrival of four successive characters elapses without a character signal at the reading head. In the four-character interval, the capacitor 176 charges sufficiently positive to apply an enabling bias to the grid 182 of the triode 184, causing conduction. The clamping diode 178 limits the magnitude of the positive voltage to protect the triode 184. The triode 184 is cut off so long as character signals are applied to the one-shot 150 with sufficient frequency to maintain discharge of the capacitor 176 and below the enabling level of the triode 184.

The triode 184 is connected for cathode-follower output. During periods of non-conduction, the output is at the potential of the source of negative bias 194. When the flow of character pulses at the one-shot 150 is interrupted, the capacitor 176 starts charging positively through the resistor 172 until the triode 184 conducts. The output of the triode 184 when conducting, approaches the potential of the positive bias source 188. The triode 184 output is applied to the Schmitt trigger 46 and to the "and" gate 44. Consequently, when message characters are being detected at the $\alpha$ head, the hole detector circuit 42 applies a low voltage to close the "and" gate 44. The Schmitt trigger 48 is modified to provide a pulse output whenever the tube 184 conducts, applying a more positive input voltage.

Should the information handling system 10 be operating in any of the other possible operating modes, such as merge, extract, etc., described in the above-mentioned Ayres and Smith application, entitled "Information Handling System," the system 10 will supply proper tape selection signals to the tape control units 32 and 34. In these modes also, the FC$h\alpha$ pulse, properly delayed, provides start signals for the input and output tapes 12, 14. The input tapes 12 are also stopped by the FC$h\alpha$ signals. Similarly, the surge tank character output signals FCO and LCO provide stop signals to the output tapes 14.

As will be apparent from the foregoing description, a spacing control system according to the present invention may be adapted for use with any serial information storage system and is not limited to use with the particular information storage system described. By the selection and delay of initial and terminal characters, an accurate control of the spacing between successive blocks of recorded information is provided. The spacing control system is applicable for use with intermittently operated output information storage devices which receive input information from intermittently operated input information storage devices.

What is claimed is:

1. In an information handling system employing intermittently operable input and output devices to transfer signals representing information in variable length messages of maximum length blocks from an input storage medium to an output storage medium, an arrangement for maintaining the spacings between said blocks within predetermined limits comprising means to select input and output devices for operation, means responsive to the first signal in each of said blocks for providing stop signals to non-selected input devices, for providing start signals to a selected input device, and for providing a start signal to a selected output device, and responsive to the first and last signal in each of said blocks for providing stop signals for said output devices when the duration of time between a last block signal and the next succeeding first signal exceeds a predetermined amount means deriving from the first signal in any one of said blocks a signal delayed a selected time corresponding to a selected minimum spacing between any two successive first characters of successive ones of said blocks, and means for deriving from said delayed signal a stop signal for said output devices when the said first signal in the block succeeding said one block occurs later than the said selected time after the first signal of said one block.

2. In an information handling system employing intermittently operable input and output devices to transfer information signals in variable length messages of fixed length blocks from an input storage medium to an output storage medium, an arrangement for maintaining the spacings between blocks within predetermined limits comprising means to select input and output devices for operation, means responsive to the first signal in each of said blocks for providing stop signals to non-selected input devices, for providing start signals to a selected input device, and for providing a start signal to a selected output device, and means responsive to the first and last signal in each of said blocks for providing stop signals for said output devices and including first, second, and third delay means for signalling respectively when the duration of time (1) between a last block signal and the next succeeding first signal, (2) between a first block signal and the next succeeding first block signal, and (3) after a last block signal respectively exceed three corresponding predetermined times.

3. In an information handling system employing intermittently operable input and output devices to transfer signals representing information in variable length messages of limited length blocks from one of a plurality of input recording tapes to one of a plurality of output recording tapes and including tape selecting means, an arrangement for maintaining the spacings between messages within predetermined limits comprising means for detecting first and last signals in said blocks, time delay means coupled individually to each of said detecting means, means responsive to the first signal in each of said blocks to provide stop signals to non-selected input devices, to provide start signals to selected input devices, and to provide start signals to a number less than all of selected output devices; further means including delaying means responsive to first and last signals of blocks being transferred for providing stop signals for said output devices when the time intervals between a last block signal and the next succeeding first block signal and between successive first block signals both exceed predetermined amounts; and means responsive to said individual time delay means, said tape selecting means, and said signal providing means for controlling said input and output devices.

4. In an information handling system employing intermittently operable input and output devices to transfer information in variable length messages of limited length blocks from one of a plurality of input recording tapes to one of a plurality of output recording tapes and including tape selecting means, an arrangement for maintaining the spacings between messages within predetermined limits comprising means for detecting first and last signals in said blocks, time delay means coupled individually to each of said detecting means, means responsive to the first signal in each of said blocks for providing stop signals to non-selected input devices, for providing start signals to selected input devices, and for providing start signals to selected output devices; further means responsive to first and last signals of blocks being transferred for providing stop signals for said output devices and including first, second, and third delay means for signalling respectively when the time intervals between a last block signal and the next succeeding first block signal, between successive first block signals, and elapsed time after last block signals respectively exceed three predetermined times, and means responsive to said individual time delay means, said tape selecting means, and said signal providing means for controlling said input and output devices.

5. In an information handling system employing an intermittently operable input device and two intermittently operable output devices to transfer signal representing information in variable length messages of limited size blocks from an input recording device to one of two output recording devices, said input device having first and second reading stations, and said system including output device selection means: an arrangement for maintaining the spacings between blocks on said output recording devices within predetermined limits comprising means including time delay means responsive to first and last signals in the blocks at said first and second reading stations for providing start signals in advance of the transfer of information to the output device enabled by said selected means, means for providing stop signals to the non-selected output device, and means for providing stop signals to the selected output device when the time intervals between a last signal and the next succeeding first signal and between successive first signals respectively exceed predetermined amounts.

6. In an information handling system employing an intermittently operable input device and two intermittently operable output devices to transfer signals representing information in variable length messages of limited size blocks from an input recording device to one of two output recording devices, said input device having $\alpha$ and $\beta$ reading stations, said system further employing output device selection means, an arrangement for maintaining the spacings between consecutive blocks on said output recording devices within predetermined limits comprising a means to recognize first signals in said blocks, means including time delay means responsive to said first signals in the blocks at said $\alpha$ reading station for providing (1) start signals to the output device preconditioned by said selecting means in advance of a transfer of information, (2) stop signals to said input device, and (3) delayed restart signals to said input device, means to recognize the first and last signal in said blocks at said $\beta$ reading station, individual time delay means responsive to each of said recognition means, and means responsive to said delay means to stop an output device when the respective time intervals (1) between a last signal and the next succeeding first signal, (2) between successive first signals, and (3) after a first signal exceeds respectively three predetermined amounts.

7. In an information handling system employing at least two intermittently operable input devices and at least two intermittently operable output devices and including tape selecting means to transfer signals representing information in variable length messages of limited length blocks from one of at least two input recording tapes to one of at least two output recording tapes, said messages having characteristic starting and ending signals and said input devices having $\alpha$ and $\beta$ reading stations, an arrangement for maintaining the spacing between consecutive blocks on said output recording tapes within predetermined limits comprising means to recognize first and last block signals, code recognition means having a plurality of output conductors both of said recognition means being coupled to the $\alpha$ and $\beta$ reading stations of said input devices to signal the existence of said first block signals, last block signals, and said characteristic signals, each on different ones of said conductors, a first means including time delay means and signal gating means coupled to the output conductor of the first signal recognition means associated with said $\alpha$ reading station for providing start signals to input devices conditioned by said selecting means, stop signals to non-selected input devices, and start signals to output devices conditioned by said selecting means, and a second means including delay means and signal gating means coupled to the output conductors of said recognition means associated with said $\beta$ reading stations for providing stop signals for said output devices when the time intervals between a last or ending signal and the next succeeding first or commencing signal and between succeeding first or commencing signals both exceed predetermined amounts.

8. In an information handling system employing at least two intermittently operable input devices and at least two intermittently operable output devices including tape selecting means to transfer information signals in variable length messages of limited length blocks from one of at least two input recording tapes to one of at least two output recording tapes, said messages having characteristic starting and ending signals and said input devices having $\alpha$ and $\beta$ reading stations, an arrangement for maintaining the spacings between consecutive blocks on said output recording tapes within predetermined limits comprising a means to recognize first and last block signals including code recognition means having a plurality of output conductors and being coupled to the $\alpha$ and $\beta$ reading stations of said input devices to signal the existence of said first signals, last signals, and characteristic signals, each on different ones of said conductors, a first means including time delay means and signal gating means coupled to the output conductor of the first signal recognition means associated with said $\alpha$ reading station for providing stop signals to input devices disabled by said selecting means signals or output device signals indicating information in transfer, delayed start signals to input tapes conditioned by said selecting means signals, and start signals to output tapes conditioned by said selecting means signals, and a second means including delay means and signal gating means coupled to the output conductors of said recognition means associated with said $\beta$ reading stations for providing stop signals to said output devices when the time intervals (1) between a last or ending signal and the next succeeding first or commencing signal, (2) between succeeding first or commencing signals, and (3) after a last signal exceed predetermined amounts, and means responsive to said output device start signals to inhibit said output device stop signal at the selected output tape device.

9. In an information handling system which utilizes intermittently operated input and output devices to transfer signals representing messages recorded in blocks on magnetic tape, and which detects the commencement and termination of massages by characteristic signals, an arrangement for maintaining blank spaces between message blocks on said magnetic tape within predetermined limits, said arrangement comprising means responsive to said message signals to detect said characteristic signals, delaying means responsive to said detecting means, input and output device control means responsive to conditioning signals from said information handling system and connected to said delaying means for deriving a signal for stopping unconditioned input devices, for starting conditioned input and output devices, and for stopping said output devices when respectively the time interval between successive first signals, the time interval between a last signal and the next successive first signal and the time interval after a last signal exceed three predetermined times, said delaying means including means for delaying a predetermined time a signal derived from the first characteristic signal of any one of said blocks, said means for stopping when the time interval between successive first signals exceeds a predetermined time including a gate, and means responsive to said delayed signal for enabling said gate only during the delay of any said delayed signal.

References Cited in the file of this patent

UNITED STATES PATENTS

| | | |
|---|---|---|
| 2,634,052 | Block | Mar. 16, 1954 |
| 2,700,067 | Lockemann | Jan. 18, 1955 |
| 2,756,273 | Wampach | July 24, 1956 |
| 2,797,862 | Andrews | July 2, 1957 |
| 2,818,372 | Blakely | Dec. 31, 1957 |